(12) United States Patent
Firoiu et al.

(10) Patent No.: US 7,149,664 B1
(45) Date of Patent: Dec. 12, 2006

(54) METHOD AND APPARATUS FOR QUEUE MODELING

(75) Inventors: Victor Firoiu, Bedford, MA (US); Marty Borden, Littleton, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/579,169

(22) Filed: May 25, 2000
(Under 37 CFR 1.47)

Related U.S. Application Data

(60) Provisional application No. 60/137,082, filed on Jun. 2, 1999.

(51) Int. Cl.
*G06F 17/50* (2006.01)
*G06F 3/00* (2006.01)

(52) U.S. Cl. .............. 703/2; 703/13; 703/22; 370/230; 370/235; 370/236; 709/226

(58) Field of Classification Search ............ 703/2, 703/22, 13, 20; 370/229, 223, 395, 230–236; 709/223, 224, 226, 229, 235; 702/2
See application file for complete search history.

(56) References Cited

U.S. PATENT DOCUMENTS

| | | | | |
|---|---|---|---|---|
| 4,616,359 A | * | 10/1986 | Fontenot ............... | 370/230 |
| 5,381,407 A | * | 1/1995 | Chao ..................... | 370/233 |
| 5,805,577 A | * | 9/1998 | Jain et al. ............. | 370/234 |
| 5,828,666 A | * | 10/1998 | Focsaneanu et al. ..... | 370/389 |
| 5,995,486 A | * | 11/1999 | Iliadis ................... | 370/234 |
| 6,092,115 A | * | 7/2000 | Choudhury et al. ..... | 709/235 |
| 6,147,970 A | * | 11/2000 | Troxel .................. | 370/235 |
| 6,192,406 B1 | * | 2/2001 | Ma et al. ............... | 709/226 |
| 6,252,851 B1 | * | 6/2001 | Siu et al. ............... | 370/236 |
| 6,324,165 B1 | * | 11/2001 | Fan et al. .............. | 370/232 |
| 6,333,917 B1 | * | 12/2001 | Lyon et al. ............ | 370/236 |
| 6,377,546 B1 | * | 4/2002 | Guerin et al. .......... | 370/230 |
| 6,490,251 B1 | * | 12/2002 | Yin et al. .............. | 370/236.1 |
| 6,606,301 B1 | * | 8/2003 | Muller et al. .......... | 370/230 |
| 6,839,768 B1 | * | 1/2005 | Ma et al. ............... | 709/235 |
| 2002/0057650 A1 | * | 5/2002 | Chuah et al. .......... | 370/232 |

OTHER PUBLICATIONS

Clark et al., "Explicit Allocation of Best-Effort Packet Delivery Service" IEEE/ACM Transactions on Networking, IEEE Inc. New York, US, vol. 6, No. 4, Aug. 1, 1998, pp. 362-373.

(Continued)

*Primary Examiner*—Thai Phan
(74) *Attorney, Agent, or Firm*—McGuinness & Manaras LLP

(57) ABSTRACT

A method, apparatus, and computer program product for modeling dynamics of a queue are disclosed. A queue law function can be used to determine a control function for use in a congestion control module in a network for dropping packets. A queue law function may be determined based upon traffic conditions in the network. First a quantity that is representative of the link utilization between first and second nodes is determined. If the link is fully utilized, a quantity that is representative of an average round transmission trip time for data to be sent from the first node to the second node and an acknowledgment to be received by the first node is calculated. The queue law function which is dependent on a data drop probability based upon the link utilization, the buffer size, and the average round trip transmission time is determined. From this queue law function, parameters for defining a control function can be derived. These parameters include the minimum buffer size and the maximum expected queue size during normal operation for the node.

13 Claims, 18 Drawing Sheets

OTHER PUBLICATIONS

Floyd et al., "Random Early Detection Gateways for Congestion Avoidance" IEEE/ACM Transactions on Networking, IEEE Inc. New York, US, vol. 1, No. 4, Aug. 1, 1993, pp. 397-413.

Woo-June et al., "FRED- Fair Random Early Detection Algorithm for TCP over ATM networks" Electronics Letters, IEE Stevenage, GB, vol. 34, No. 2, Jan. 22, 1998 pp. 152-154.

Floyd et al, "Random Early Detection . . . ", IEEE/ACM Transactions on Networking, vol. 1, No. 4, pp. 397-413, Aug. 1993.

Kim et al, "FRED—fair random early detection algorithm for TCP over ATM networks", Electronics Letters, vol. 34, No. 2, Jan. 22, 1998.

Clark et al, "Explicit Allocation of Best-Effort Packet Delivery Service", 1998 IEEE/ACM Transactions on Networking, vol. 6, No. 4, pp. 362-373, Aug. 1998.

Zhou et al, "Design of Per-VC Queueing ATM Switches", School of Info. Tech. & Engineering, U. of Ottawa, pp. 304-308, 1998.

Firoiu et al, "Study of Active Queue Management for Congestion Control", IEEE Infocom, XP-001044238, pp. 1435-1444, 2000.

* cited by examiner

METHOD AND APPARATUS FOR QUEUE MODELING

PRIORITY

This application claims priority from U.S. Provisional Application 60/137,082 entitled "Apparatus and Method of Design and Configuration of Active Queue Management in Routers and Switches" filed on Jun. 2, 1999 which is incorporated by reference herein in its entirety.

FIELD OF THE INVENTION

The invention generally relates to networks and, more particularly, the invention relates to the management of a queue at a node in a network.

BACKGROUND OF THE INVENTION

Congestion occurs in a network when resource demands exceed capacity. In prior art communications networks, resource demands exceed capacity when data is sent on a path from a sender to a recipient and a node on the path cannot send data as quickly as it is received. In this case, the throughput of the node decreases and may drop to zero. When the throughput drops at the node, received packets build up in the node's memory, referred to as a buffer, increasing the number of accumulated packets forming a queue until the buffer is full and overflows. As the buffer overflows, data at the receiver may be delayed or the data may be lost. Such a state is generally a transient condition in a network as users of the network vie for resources during peak time periods. In the past, nodes in high-speed networks have been forced to include large buffers in an attempt to avoid overflow during periods of congestion. As a result of increasing buffer size, defined as accumulated packets waiting to be serviced, the average queue size increases. The average queue size for a buffer is the average number of packets present in the buffer.

One technique for avoiding large queues and large network delays is Random Early Detection (RED). RED is designed to accompany transport-layer congestion control protocols such as TCP and operates as a mechanism for regulating the amount of information that is sent to a node by decreasing the number of acknowledgment packets that are sent to the sender. The congestion control mechanism in TCP is a closed control system that reacts to unacknowledged packets by re-sending the unacknowledged packets and reducing the transmission rate. Systems that implement RED detect congestion by computing the average queue size as data is received into a buffer. When the average queue size exceeds a preset threshold, the node refuses to service i.e. "drops" a percentage of packets as determined by a control function.

The queue sizes determined by the RED technique, in combination with TCP congestion control, are subject to large size oscillations. Using the RED technique, parameters defining the control function are set by a system's administrator, without a methodology for determining values for the parameters. As such, the control function may be unstable and fail to adequately regulate the feedback to the TCP congestion control. The large oscillations that result under such circumstances in one node can propagate to other nodes and cause erratic behavior in the network. Because RED does not define a methodology for calculating the parameters, system administrators have used trial and error techniques. These trial and error techniques do not provide for a controllable network.

SUMMARY OF THE INVENTION

In a TCP network in which data that is sent is acknowledged by a receiver, the queue size of a buffer in a node may be regulated in a congestion control module by dropping packets, thus decreasing the sending rate of the sender and adjusting the size of the queue at the receiver. This environment is the motivation for determining a queue law function that estimates the average queue size. A method, apparatus, and computer program product for modeling dynamics of a queue are disclosed. The queue law function can be used to determine a control function for use in a congestion control module in a network for dropping packets. A queue law function may be determined based upon traffic conditions in the network. First a quantity that is representative of the link utilization between first and second nodes is determined. If the link is fully utilized, a quantity that is representative of an average round transmission trip time for data to be sent from the first node to the second node and an acknowledgment to be received by the first node is calculated. The queue law function which is dependent on a data drop probability based upon the link utilization, the buffer size, and the average round trip transmission time is determined. From this queue law function, parameters for defining a control function can be derived. These parameters include the minimum buffer size and the maximum expected queue size during normal operation for the node.

BRIEF DESCRIPTION OF THE DRAWINGS

The foregoing and other objects and advantages of the invention will be appreciated more fully from the following further description thereof with reference to the accompanying drawings wherein.

DESCRIPTION OF SPECIFIC EMBODIMENTS

Figure 1:
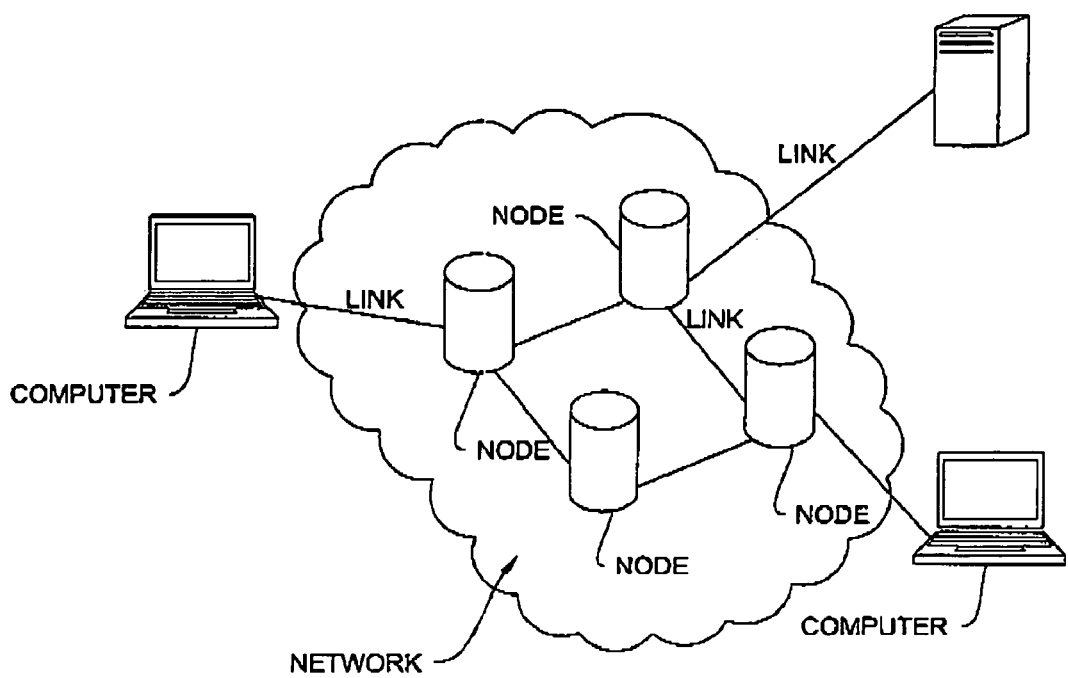
FIG. 1 shows a schematic drawing of a communications network in which the apparatus and method for queue management may be implemented.

FIG. 1 shows a schematic drawing of a communications network in which the apparatus and method for queue management may be implemented. The communications network, such as the Internet, connects computers and other processing devices to other computers, servers, and processing devices via nodes so that data may be sent, received, and retrieved. All devices that forward and filter data, such as, but not limited to, routers, bridges, b-routers, switches, repeaters and gateways will be referred to as nodes in the following description and claims and all connections between such nodes shall be referred to as links.

In the following description and appended claims the term "flow" shall refer to a signal representative of data sent from a sending node to a receiving node. In the description and the claims the term "capacity" refers to the total amount of data that a link can process in a given time and is equivalent to line speed.

Nodes within the network each have at least one ingress and one egress port. A node may receive multiple flows of data, usually in the form of packets, into one or more of the ingress ports where each flow is stored and queued in a buffer prior to routing the data flow to an egress port in the node. As more information flows into the buffer, the queue becomes larger until the capacity of the buffer is reached and then the subsequent data is lost. To prevent buffer overflow, the buffer of each node is regulated by a node congestion control module that operates in conjunction with an end-system congestion control module. The node congestion control module regulates the average queue size by indicating to the sending node that congestion is occurring at the receiving node. The end-system congestion control module refers to the part of the transport layer protocol that is responsible for adjusting the sending rate at the sending node. For example, in a network employing TCP as the transport layer protocol, the node congestion control module drops acknowledgement packets to indicate congestion and the end-system congestion control module decreases the sending rate in response. In another example, the node congestion control module may send an acknowledgement packet from the receiver indicating that congestion is occurring and again the end-system congestion control module decreases the sending rate at the sending node. It will be understood by those of ordinary skill in the art, that any end-system congestion control module may be used which causes a sending node to adjust its sending rate as the result of congestion. Additionally, the node congestion control module would be designed to work in conjunction with the chosen end-system congestion control module. For the remainder of this disclosure, the end-system congestion control module will refer to an embodiment in which TCP is the transport layer protocol. This is done for exemplary purposes and is in no way meant to limit the scope of the disclosed invention.

In a TCP environment, when packets of data are dropped, the node does not send an acknowledgment packet to the sending node. As a result, the sending node slows down its sending rate, which has the effect of decreasing the size of the average queue in the buffer of the receiving node. As stated before, the average queue size is the average amount of data found in the node's buffer. The average queue size shall be represented by q. The interaction between the node congestion control and the end-system congestion control has the effect of stabilizing the node's queue size and the rate it drops packets. The values of average queue size and drop probability in such a stable or steady state are referred to collectively together as a steady-state operating point.

Figure 2:
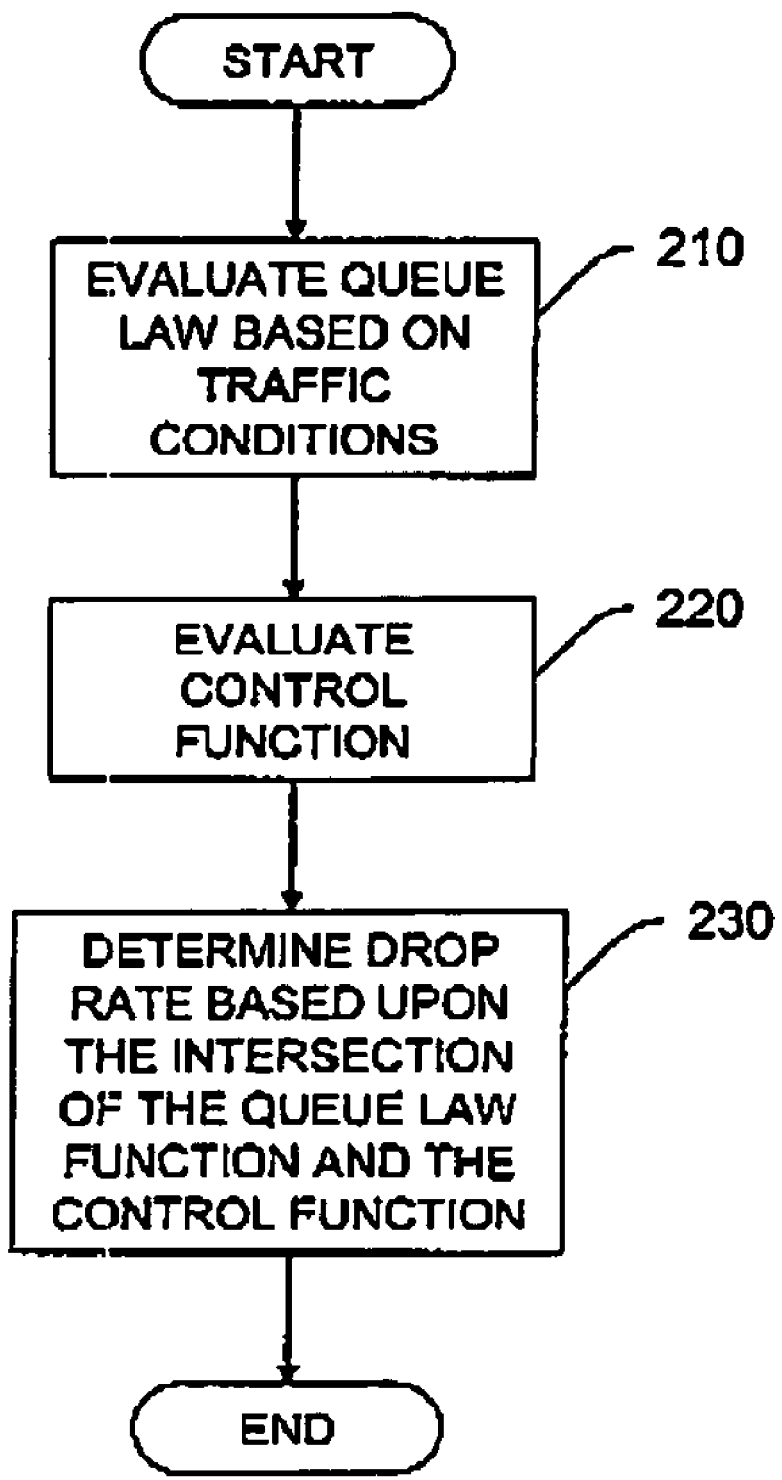
FIG. 2 is a flow chart for determining the steady state operating point of a queue.

In a node that incorporates a congestion control module and implements one embodiment of the invention for queue management, the steady-state operating point can be calculated based on the solution for a system of two equations. The two equations being a queue law function and a control function. FIG. 2 shows a flow chart for determining the steady-state operating point. First the queue law is evaluated (step 210). This first function represents a characterization of the end-system's congestion control. In other words, the queue law function is an approximation of the average queue size of an exemplary queue in a node based upon the traffic characteristics and the percentage of dropped packets. For example, one embodiment of the queue law equation which will be further explained and derived below can be:

$$G(p) = \min(B, c(T_R^{-1}(p, c/n) - R_0))$$

| | |
|---|---|
| p | Drop percentage |
| B | Buffer |
| c | Line speed |
| $T_R^{-1}$ | Inverse throughput |
| N | Number of flows |
| $R_o$ | Round trip transmission time outside the queue |

Next the control function is determined (Step 220). The control function is characteristic of the node congestion control module. It determines the drop percentage when the buffer of the node is filled above a predetermined threshold based upon an average queue size as an input parameter. The control function may be any type of function, but is preferably a linear function. The point of intersection between the queue law function and the control function determines a value to which the drop percentage should be set and the control module uses the drop percentage to drop packets evenly across all flows (step 230).

The queue law may be used in variety of ways for the design, configuration, and operation of a congestion control module. In one embodiment, the congestion control module may be enabled to calculate both the queue law and the control function based upon input data concerning traffic characteristics, and determine the point of intersection of the functions thus determining the packet drop rate. In another embodiment, the queue law may be used to model the queue variation for a node over all drop probabilities based upon maximum and minimum traffic conditions. This modeling of the queue can aid a system administrator in determining configuration parameters for the control function of the congestion control module of a node in a network in order to avoid oscillations in the queue. In such an embodiment, a predefined control function exists in the congestion control module that has a definable shape, and the queue law provides information for configuring the shape so that the system remains stable. In yet another embodiment, the modeling of the queue law based upon the expected maximum and minimum traffic conditions can be used to define a range of operation for a node. The ranges of operation can then be used in the design of a node to determine the minimum buffer size.

Figure 3:
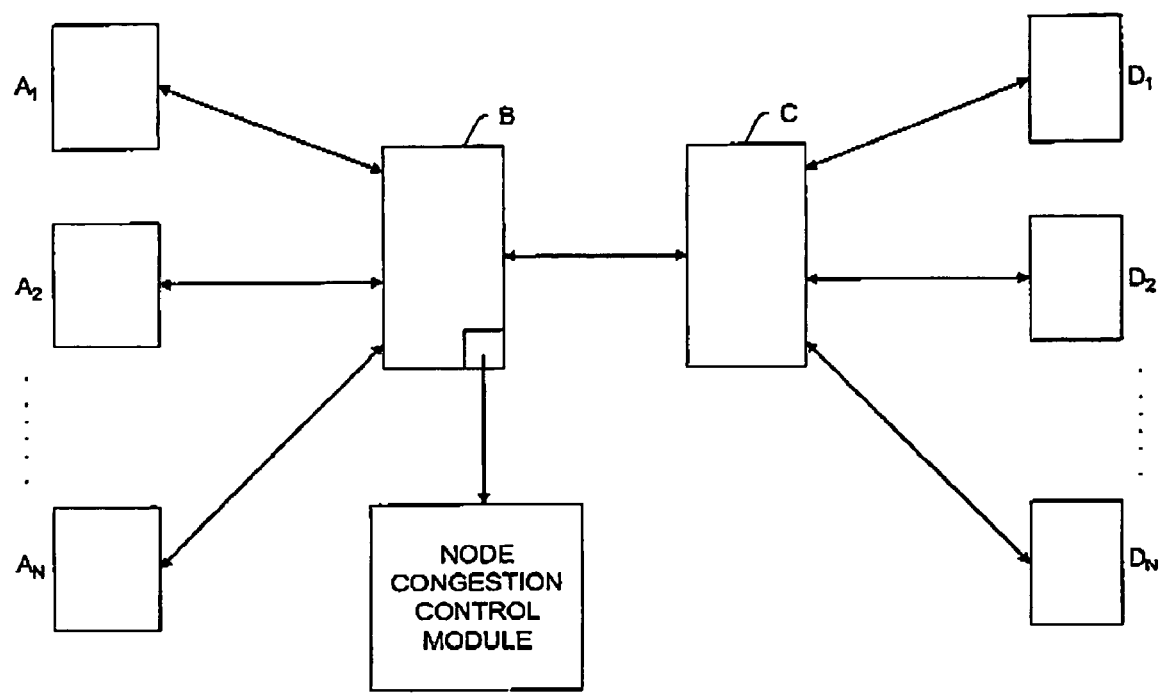
FIG. 3 shows a simplified network, which is used to simulate a more complex communications network.

The derivation of the queue law function is shown in the next two figures. FIG. 3 shows a network that is used as a model for determining the queue law for a complex communications network. The network of FIG. 3 is a simplification of a real network such as the Internet. In this simplified network, the transport layer protocol is TCP. The simplified network is used to determine a queue law function for a node based upon known traffic characteristics for the node, such as, the line speed, number of TCP flows and propagation delay. The queue law function determines an average queue size for a buffer based upon a drop percentage, where the drop percentage is an independent variable.

In the simplified network, a node congestion control module is situated in node B. The communications system acts as a feedback control system in which the control module is the sending node, the controlling element is the node congestion control module, the feedback signal is the drop percentage, and the controlled variable is the sending rate. A total of n flows, from node $A_1$ through node $A_n$, flow into node B, which contains a node congestion control module. Node B is connected to node C through a single link.

One function/operation of the node control module is to maintain the cumulative data rate of all flows below or equal to the link's capacity so that the rate of the combined flows from node B, i.e. the throughput, is less than or equal to the capacity of the link between B and C. The throughput of a TCP flow is dependent on the drop percentage p, the average round trip time R, the average packet size M, the average number of packets acknowledged in one acknowledgement message b, the maximum congestion window size advertised by the flow's TCP receiver $W_{max}$, and the duration of the basic TCP timeout $T_o$. The throughput of a TCP flow is approximately equal to $$T(p,R) = \begin{cases} M\dfrac{\dfrac{1-p}{p} + \dfrac{W(p)}{2} + Q(p,W(p))}{R\left(\dfrac{b}{2}W(p)+1\right) + \dfrac{Q(p,W(p))F(p)T_0}{1-p}} & \text{if } W(p) < W_{max} \\ M\dfrac{\dfrac{1-p}{p} + \dfrac{W_{max}}{2} + Q(p,W_{max})}{R\left(\dfrac{b}{8}W_{max} + \dfrac{1-p}{pW_{max}} + 2\right) + \dfrac{Q(p,W_{max})F(p)T_0}{1-p}} & \text{otherwise} \end{cases}$$

where $$W(p) = \frac{2+b}{3b} + \sqrt{\frac{8(1-p)}{3bp} + \left(\frac{2+b}{3b}\right)^2}$$

$$Q(p,w) = \min\left(1, \frac{(1-(1-p)^3)(1+(1-p)^3(1-(1-p)^{w-3}))}{1-(1-p)^w}\right)$$

$$F(p) = 1 + p + 2p^2 + 4p^3 + 8p^4 + 16p^5 + 32p^6$$

which was derived in Padhye, Firoiu, Towsley and Kurose *A Stochastic Model of TCP RENO congestion Avoidance and Control* Technical Report CMPSCI TR-99-02 University of Massachusetts, Amherst 1999 which is incorporated by reference herein in its entirety.

Figure 4:
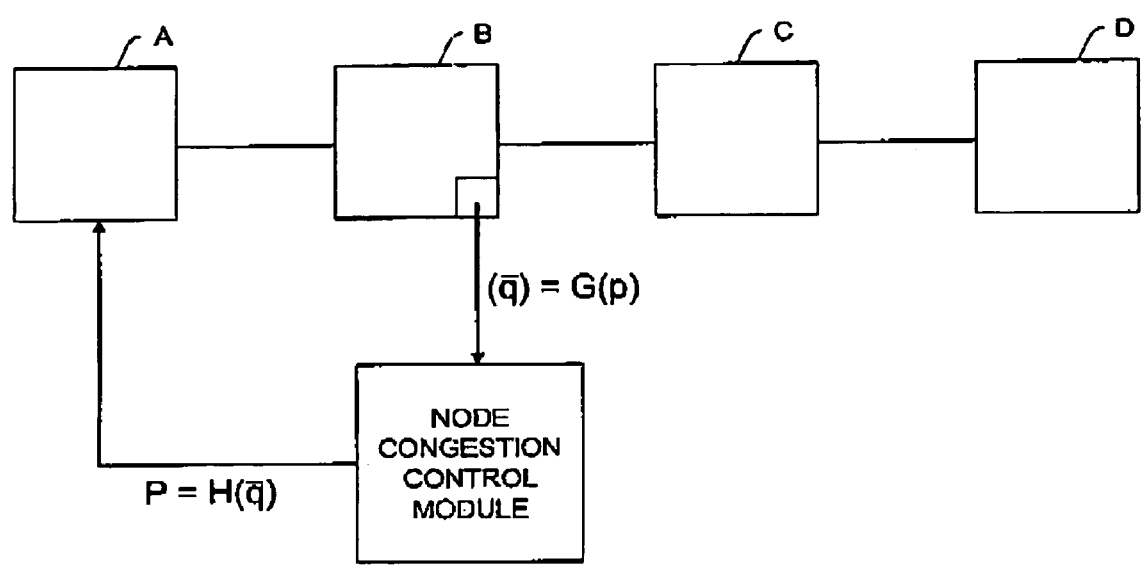
FIG. 4 is a block diagram showing another simplification of the network where the network is reduced to a single-flow feedback system.

For discussion purposes, the assumption is made that all links into node B and out of node C have enough capacity. Accordingly, the link between B and C is the only link where congestion can occur. All n flows combine at the buffer of node B and each flow provides digital data that adds to the queue. One simplification of the model network that is used to determine the queue law function assumes that there is only one link between two nodes. Additionally, packets of data are assumed to flow in only one direction. In FIG. 3 data flows from nodes $A_{1-n}$ to nodes $D_{1-n}$. The only data that flows in the other direction is assumed to be acknowledgment packets (ACKs). Further, the number of flows into node B is assumed to remains constant. Assuming that all flows have the same average round trip time and the same average packet size and that the maximum congestion window size is so large that it does not influence the throughput, the network may be reduced to a single-flow feedback system as shown in FIG. 4.

Based on aforementioned assumptions, the queue law=G(p) is determined (where is the average size of the queue and p is the drop probability). Since the link between A and B is the only possible point of congestion, the average round trip time of a packet is the sum of the average waiting time in the queue of node B and $R_0$, the propagation and the round-trip transmission time outside the node. Assuming a FIFO (First and First Out) queuing scheme, the average waiting time in the queue is q/c and the overall round trip time for a packet is the sum of the average waiting time in the queue and the propagation and transmission time on the rest of the round trip so that $R=R_o+q/c$.

Regulating the queue due to congestion is only relevant when the link is fully utilized, since the average queue size is small otherwise. The link utilization can be determined through the following calculation:

$$u(p) = \frac{T(p,R_0)}{c/n}$$

The link utilization u(p) takes values between 0 (not utilized) and 1 (fully utilized). If it is determined that the link is fully utilized, the queue law function for providing the average queue size is:

$$G(p) = c(T_R^{-1}(p,c/n) - R_0)$$

where c is equal to the line speed and $T_R^{-1}(p,\tau)$ is the inverse of T(p,R) in R, i.e., $T_R^{-1}(p,T(p,R))=R$. Since the average queue size cannot exceed the size of the buffer B, the queue law is:

$$G(p) = \max(B, c(T_R^{-1}(p,c/n) - R_0))$$

Figure 5:
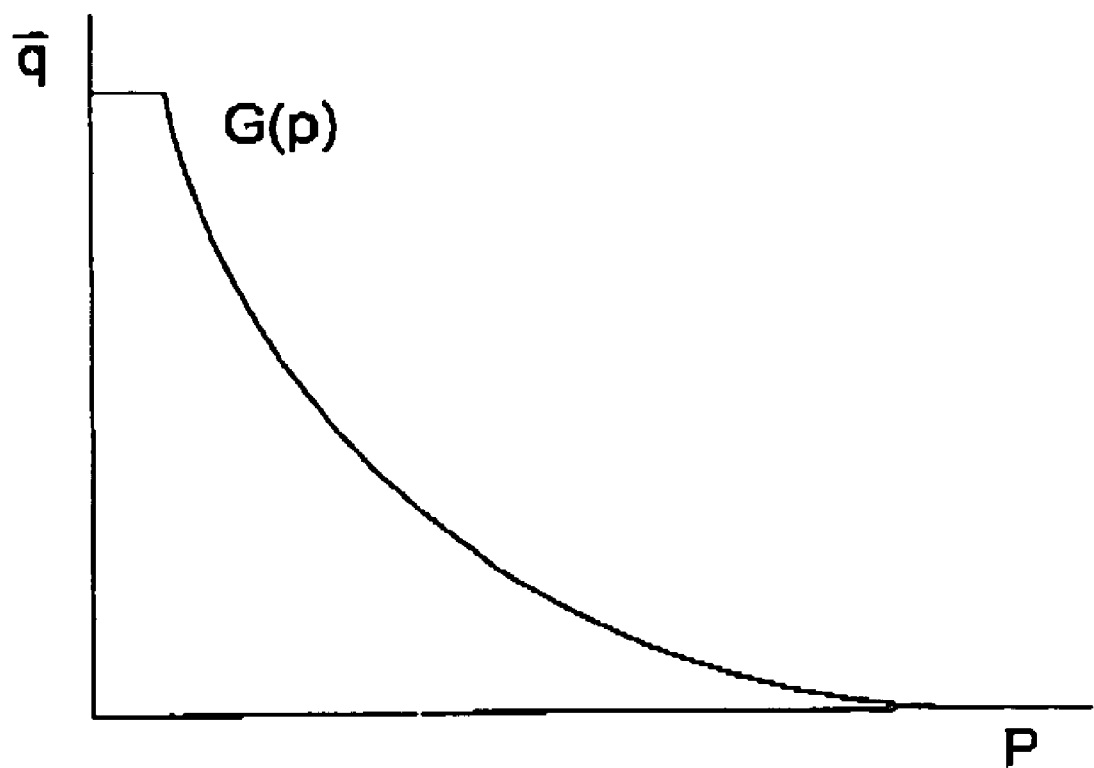
FIG. 5 is a sample plot of the queue law function.

A sample plot of the queue law function is provided in FIG. 5. It should be understood by those skilled in the art that additional simplifications may be made that result in different equations for the utilization and the average queue size. For example, if the system is assumed to be free of TCP timeouts, the throughput T(p,R) can be approximated as $$T(p, R) = \frac{M}{R}\sqrt{\frac{3}{2bp}}$$

and thus it can be easily shown that:

$$G(p) = \max\left(B, nM\sqrt{\frac{3}{2bp}} - cR_0\right)$$

if the link is fully utilized, i.e., if u(p)=1 where $$u(p) = \frac{nM}{cR_0}\sqrt{\frac{3}{2bp}}$$

The resulting queue law equation can be programmed into a processor or programmed in software to be executed or embedded into an electronic chip associated with the node congestion control module for automatic calculation during operation of the node based upon traffic conditions. Traffic conditions include the line speed c and the round trip time R, the number of flows, n, and the throughput or all variables necessary to calculate the throughput. For example, the minimum and maximum throughput per flow ($\tau_{min}$, $\tau_{max}$) which for a dial-up modem in a wide area network is 28.8 Kb/s for $\tau_{min}$ and 56 Kb/s for $\tau_{min}$ however the speed of $\tau_{min}$ and $\tau_{max}$ the connection is implementation dependent. Additional traffic characteristics include the minimum and maximum packet sizes ($M_{min}$, $M_{max}$) the minimum and maximum round trip time outside of the queue ($R_{0min}$, $R_{0max}$) the minimum and maximum drop probability outside of the queue ($p_{0min}$, $p_{0max}$) and the minimum and maximum TCP receiver window (($W_{max})_{min}$, ($W_{max})_{max}$).

Figure 6:
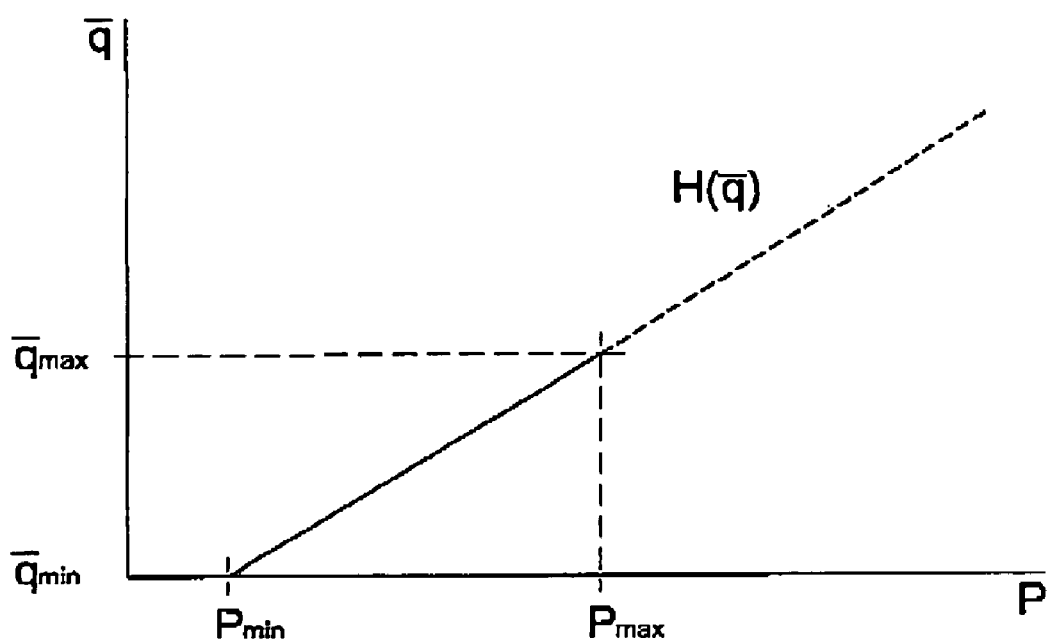
FIG. 6 is a graphical representation of the queue law function and the control function in which the axes are the average queue size and the drop percentage.

FIG. 6 shows a graphical representation of the queue law function and the control function in which the axes on which the functions are graphed are the average queue size (Y-axis) and the drop percentage (X-axis). The two functions are each dependent on one variable that is the product of the other function and as a result, both functions intersect at a point. This intersection point is the expected equilibrium for the node based on the initial traffic conditions. The equilibrium point provides the drop percentage for the congestion control module so that data packets may be dropped as the data enters the buffer of the node to regulate the queue size. By dropping packets based upon a percentage of packets entering the node, each flow is proportionally affected regardless of the sending rate of the particular flow.

Figure 7:
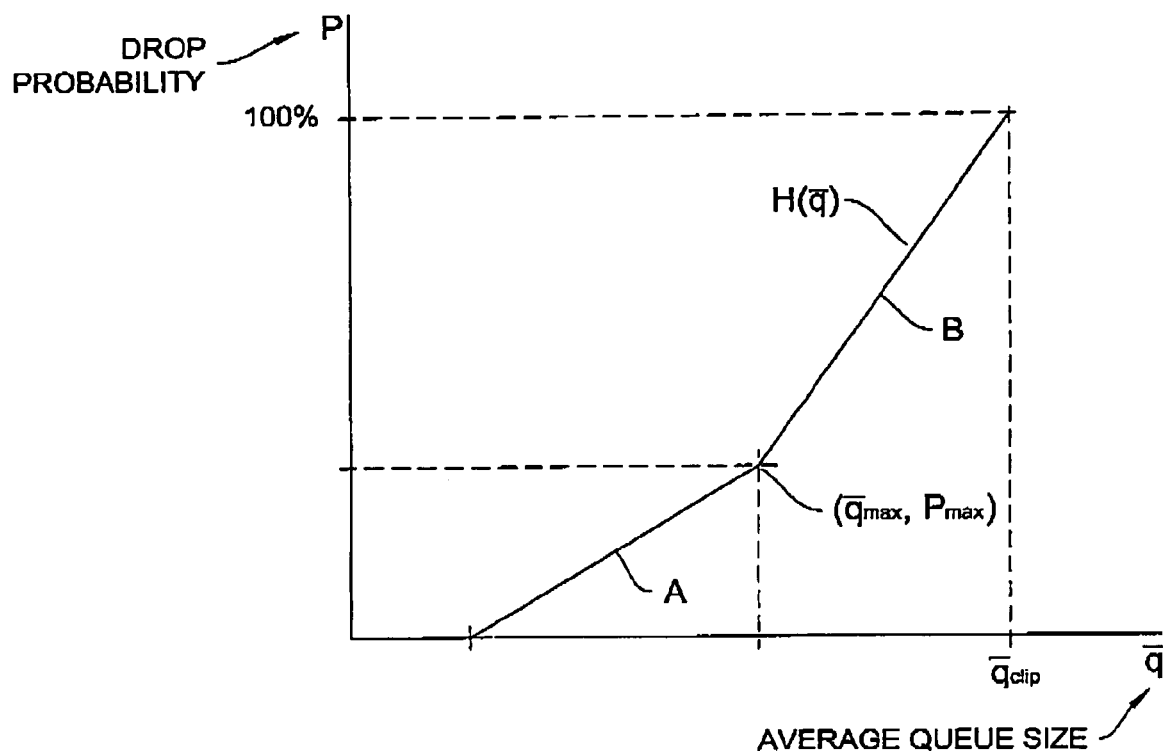
FIG. 7 is a graphical representation of a control function.

FIG. 7 is a graphical representation of the control function H(q)=p. In an exemplary embodiment, the control function is composed of two linear segments. The first linear segment, segment A, defines the expected operational range of the average queue size. The segment is selected to be linear for ease of design and management as a control system, although a non-linear segment can be substituted. The maximum point of the first segment defines the maximum expected values for the average queue size and the corresponding drop rate ($q_{max}$, $p_{max}$) when the node is under normal operating conditions, i.e. there is not an unexpected change in any of the traffic conditions. For example, if a node normally handles up to 1000 simultaneous flows, and traffic conditions change producing 100,000 flows, such a scenario would cause the node to operate in overload outside of the normal operating conditions. The second linear segment, segment B, defines the overload operation range for the average queue size. This segment is preferably designed with a steeper slope as shown in FIG. 7, but does not have an infinite slope, as an infinite slope creates a discontinuity and possible uncontrollable oscillations to the average queue size. The steeper slope of segment B allows the queue to degrade gracefully to its normal operational range along Segment A. Segment B is defined by points ($q_{max}$, $p_{max}$) and (qclip, 1) where qclip is defined, as shown in FIG. 7, as the average queue size at which there is a one hundred percent drop rate. It should be understood that segment B, like segment A, may be non-linear in shape.

Although the intersection point is the point of convergence for the average queue size, the communications network may encounter various changes that affect the queue law and cause fluctuations affecting the average queue size of the node. These transient fluctuations are normal in complex communications networks and the queue average will eventually return to the equilibrium point if the system is stable. If the maximum value of the control function on segment A ($q_{max}$, $p_{max}$) lies below the equilibrium point and thus inside of the queue law function, the transient behavior of the system is unstable causing the queue size to fluctuate in an oscillatory pattern. The average queue size can oscillate between empty and full buffer, causing the packet drop percentage to vary between zero and 100%. As packets are dropped and the sending rate of the sending node varies, a similar state can occur in the queue of the sending node. As such, the oscillations may reverberate throughout the communications network.

Figure 8:
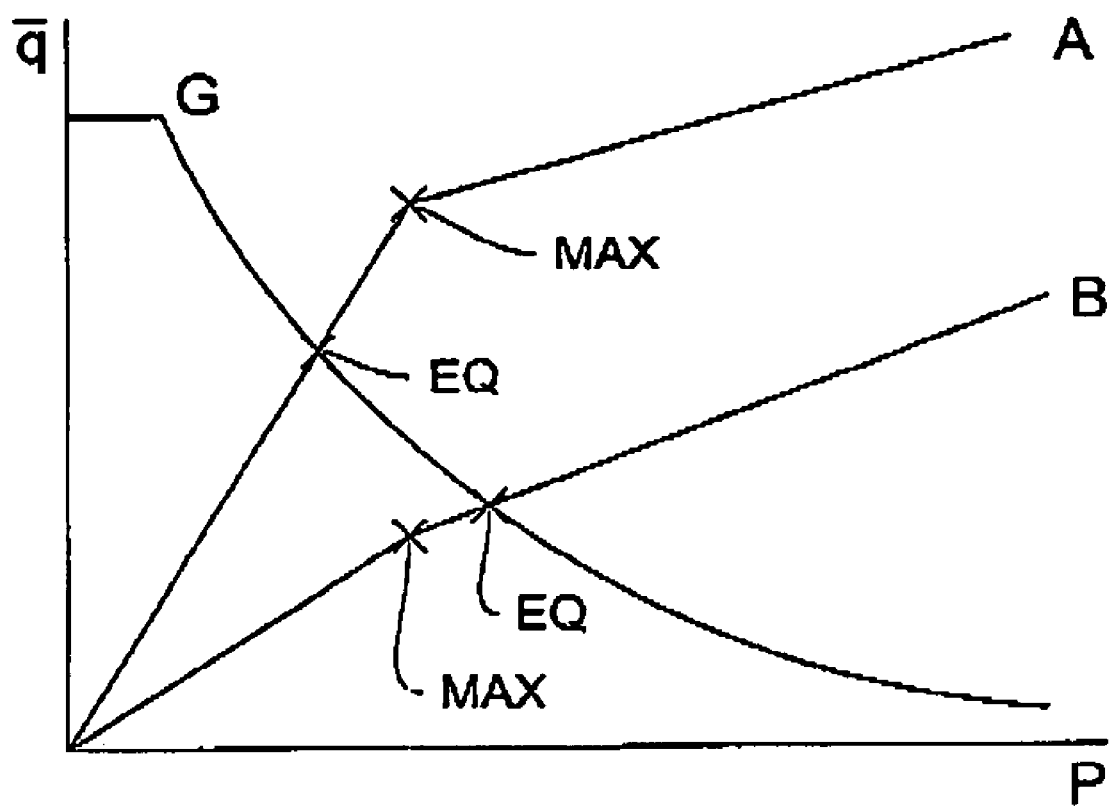
FIG. 8 is a graphical representation showing two control functions superimposed upon the queue law function.

FIG. 8 shows two control functions superimposed upon the queue law function. In control function A the expected maximum value ($p_{max}$, $q_{max}$) for the control function lies above the equilibrium point and therefore outside of the queue law function, allowing the transient response of the system to decay so that the oscillations of the system dissipate and the system returns to the equilibrium point. The maximum value ($p_{max}$, $q_{max}$) of control function B is shown to be below the equilibrium point and therefore inside the queue law function which results in the average queue size fluctuating causing oscillations in the queue and throughout the communications network.

Figure 9:
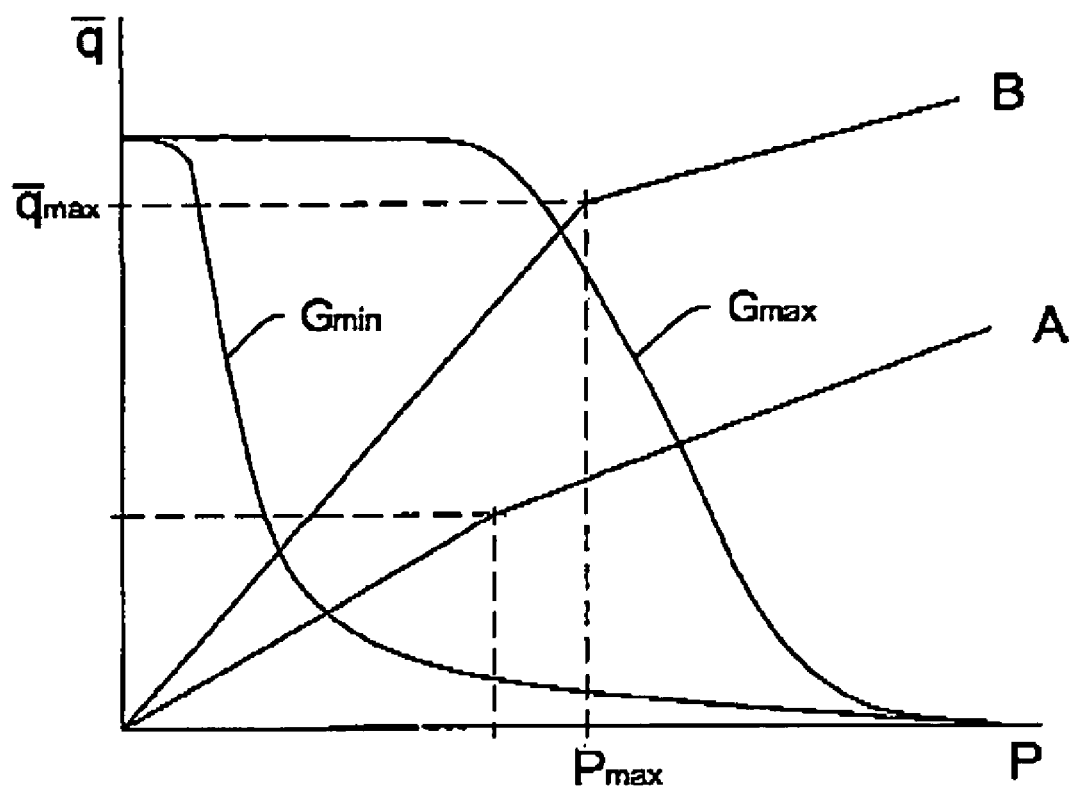
FIG. 9 is a graphical representation of the ranges that the queue law function may take based upon the values for the number of flows, the size of a packet, and the round trip transmission time.

It should be understood by those skilled in the art that the queue law can have various curves depending on the input values of n, the number of flows, M, the average packet size, and R, the average round trip time. As shown in FIG. 9 by the shaded region, the queue law may take on any value within this region dependent upon the values for n, M, and R. If the control function is originally set to control function A pictured in FIG. 9 and the queue law curve is originally $G_{min}$, the system is stable at initialization and large fluctuations do not occur in the average queue size. If the parameters n, M, and R change to their maximum, maximum, and minimum values respectively during the course of operation of the node, the queue law curve would then become $G_{max}$, and the control function A would have transients which would cause average queue size fluctuation. If in contrast, the control function is set initially to control function B of FIG. 9, no matter how n, M, and R vary over the course of operation of the node, the equilibrium point is always maintained inside the queue law curve and all transients dissipate and the system settles at the equilibrium.

Figure 10:
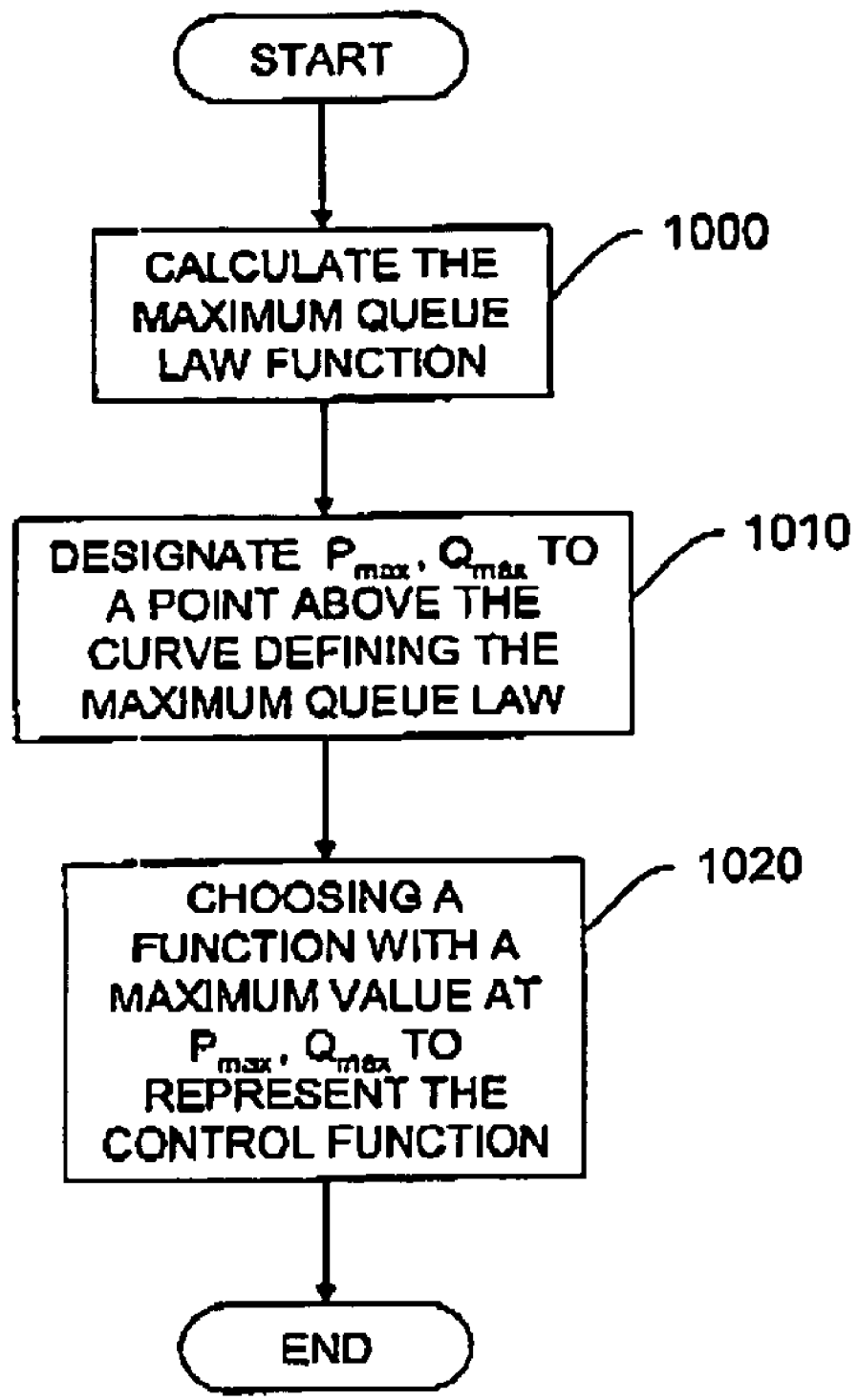
FIG. 10 shows a flow chart of the steps used by either a designer of a congestion control module or of a system administrator setting the parameters for defining the control function of the congestion control module.

FIG. 10 shows a flow chart of the steps used by either a designer of a congestion control module or by a system administrator setting the parameters for defining the control function of the congestion control module. First, the value of $G_{max}$ is calculated (step 1000). Using the calculated value $G_{max}$, a designer or system administrator of a congestion control module for a node, can design the control function so as to avoid oscillations by designating the maximum point of the control function, as defined by ($p_{max}$, $q_{max}$), outside the maximum queue law curve $G_{max}$ (step 1010). The designer or system administrator can then define the control function to be any function with expected operating range ending at ($p_{max}$, $q_{max}$) outside of $G_{max}$ (step 1020). The function may already be defined as in a congestion control module which uses RED, and as such a system administrator only needs to input parameter values including ($p_{max}$, $q_{max}$) so that step 1020 is unnecessary. The designer or system administrator may add a further segment to the control function which is defined between ($p_{max}$, $q_{max}$) and the maximum buffer size $q_{clip}$ which also defines the point at which there is a 100 percent packet drop rate.

It should be understood that a computer program can be created for a node designer for determining allowable values for the maximum point of the control function as defined by the intersection of the queue law function and the control function based upon expected ranges of traffic conditions for the node. Further this program need not be part of a congestion control module and may be used offline during the design phase of a node.

The actual value for ($q_{max}$, $p_{max}$) as explained above may be any value that lies outside of the queue law function. However, to fix a value for ($q_{max}$, $p_{max}$), one of the two variables must be known and the other variable calculated as shown in the flow chart of FIG. 11. Determining ($q_{max}$, $p_{max}$) is accomplished by first selecting a policy for queue management. For example, the policy can be a drop conservative or delay conservative policy, but other policies can be used (step 1100). If the drop conservative policy is selected, $p_{max}$ is set by the designer or system administrator (step 1110). If the delay conservative policy is selected $d_{max}$, the maximum allowable delay, is set by the designer or system administrator (step 1115). For a drop conservative policy, given $p_{max}$, the condition to avoid oscillations becomes $q_{max} > G_{max}(p_{max})$ providing a formula for fixing $q_{max}$ (step 1120). Since $q_{max}$ defines the maximum average queue size, this threshold may be increased by 20% to account any spikes in the average buffer size so that $q_{max} > 1.2 G_{max}(p_{max})$. It should be understood by those of ordinary skill in the art, that the 20% added is used for exemplary purposes and that any value greater than $G_{max}(p_{max})$ may be used for determining $q_{max}$ and avoiding perturbations. As such, the maximum value for the control function can be set. For a delay conservative policy, a value for $d_{max}$ is given, thus $q_{max} = d_{max}$ c (step 1125). Finally, $p_{max}$ may be determined by applying $p_{max} > G^{-1}{}_{max}(q_{max})$ (step 1130). As with the drop conservative policy, oscillations may be avoided by adding in a factor of 20% such that $p_{max} = 1.2\ G^{-1}{}_{max}(q_{max})$. Again this 20% is used for exemplary purposes and any value greater than the threshold of $G^{-1}{}_{max}(q_{max})$ for calculating $p_{max}$ may be used.

Figure 11:
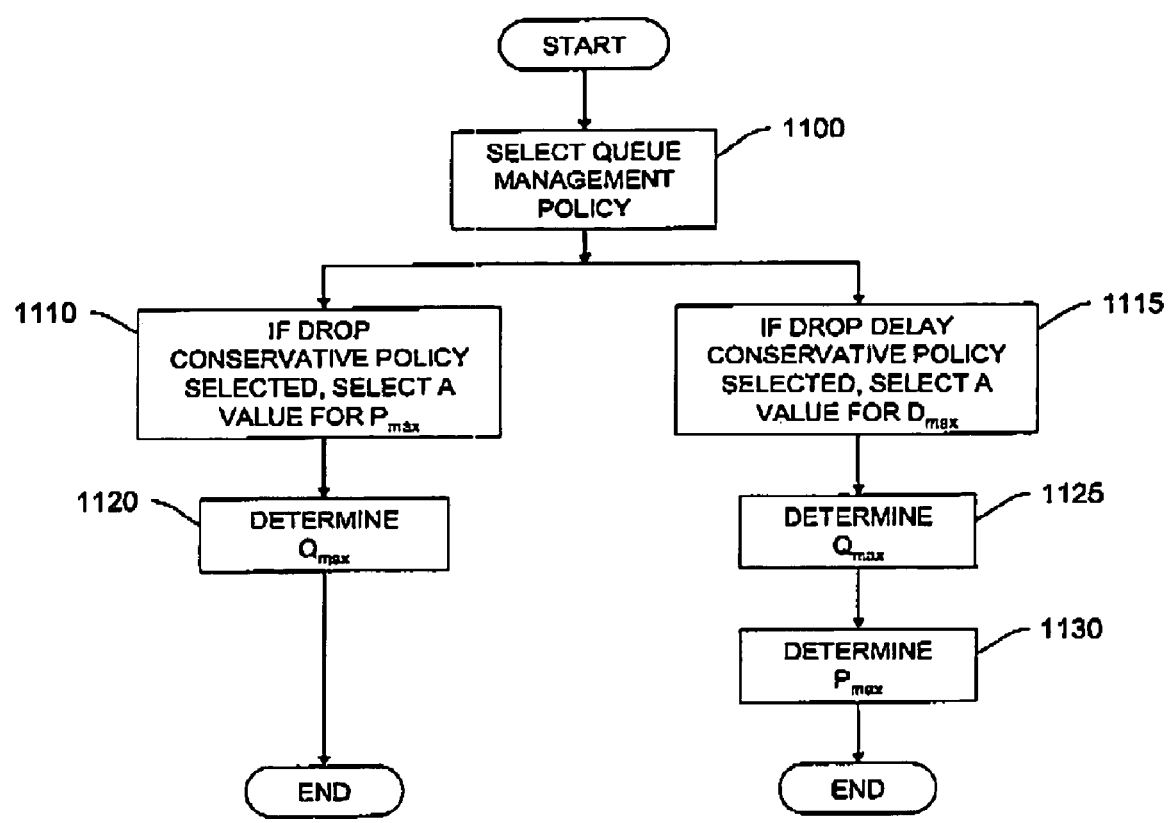
FIG. 11 is a flow chart showing the steps taken in calculating the point $(q_{max}, p_{max})$.
Figure 12:
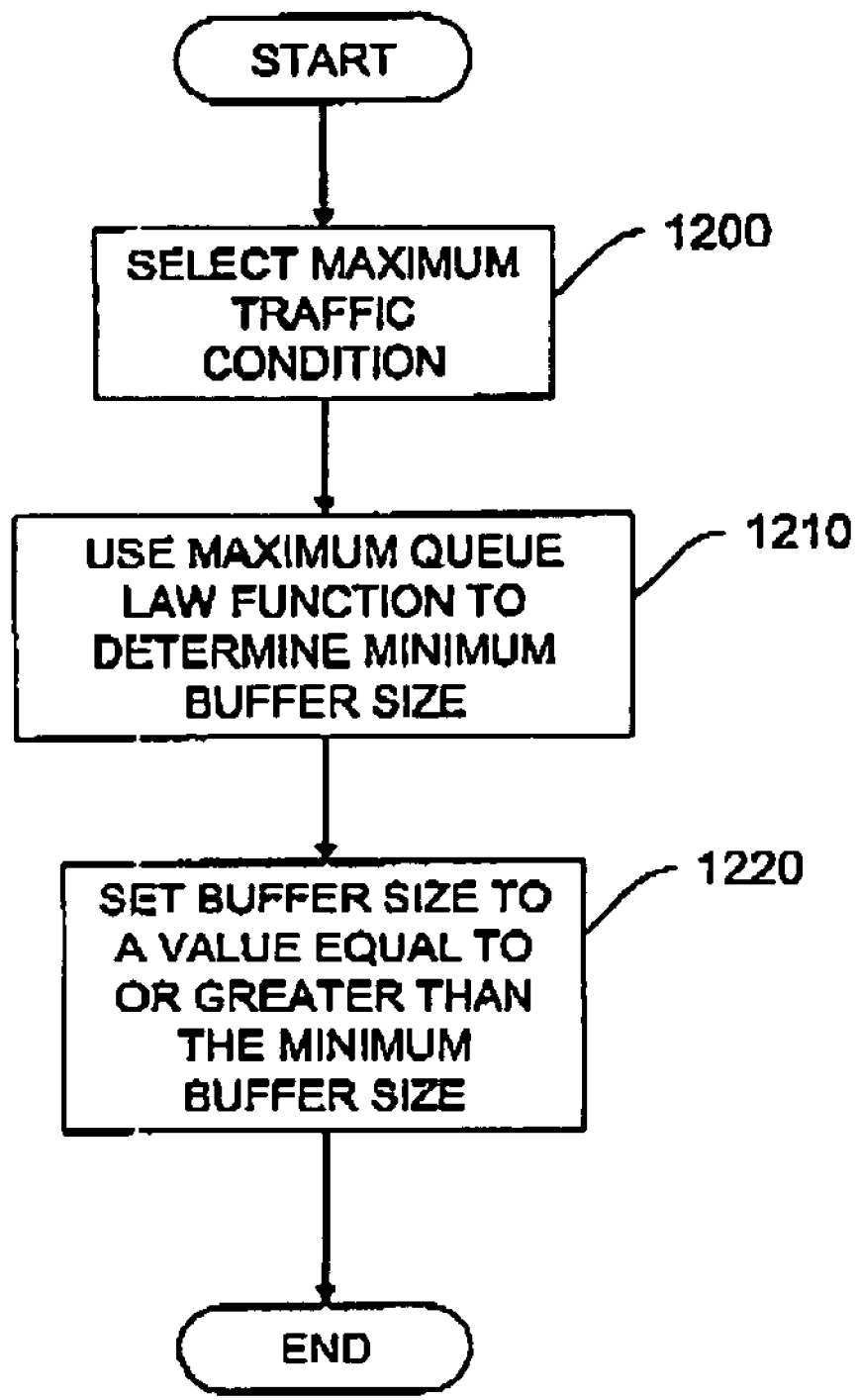
FIG. 12 is a flow chart showing the steps taken in calculating the minimum buffer size.

The queue law function can also be used to determine the minimum needed buffer size, B for operation in a network environment having a defined set of maximum traffic conditions in a fashion similar to the method described with respect to FIG. 11. FIG. 12 shows a flow chart of the steps taken in calculating the minimum buffer size. First, a maximum traffic condition is selected (step 1200). The maximum traffic condition is selected based upon the desired policy for queue management. If a drop conservative policy is chosen, a low drop probability is desired and the maximum drop percentage $p_{max}$ is known. If a delay conservative policy is chosen, a low average queue size is desired and a value for the maximum allowable delay $d_{max}$ is known. The maximum queue law function $G_{max}$ is used to determine the minimum buffer size $q_{max}$ based upon the known traffic condition (step 1210). For the drop cons. policy and for the delay conservative $q_{max} = d_{max}$ c and $p_{max} > G^{-1}{}_{max}(q_{max})$. The buffer size of the planned node is set to any value equal to or above the value for the maximum average queue size, $q_{max}$ (step 1220). In a preferred embodiment the buffer size is substantially larger than the maximum average queue size by an order of two in order to account for fluctuations.

Figure 13:
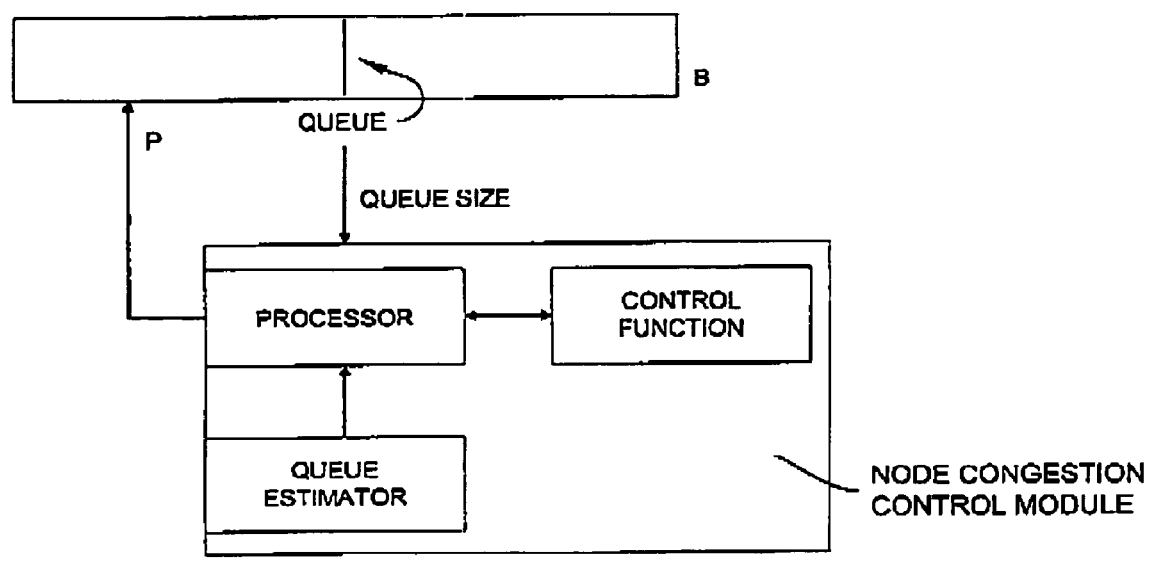
FIG. 13 is a block diagram of another embodiment of a congestion control module containing a processor and a queue estimator.

In another embodiment of the invention for operation in a node in a communications network, the congestion control module contains a processor to implement a control function and a queue estimator that computes the average queue size, which is shown in FIG. 13. A congestion control module receives as input the average queue size and outputs the drop percentage p. The node congestion control module of FIG. 13 implements a feedback node control function $p = H(q_e)$ for adjusting the average queue size of the node, where $q_e$ is an estimate of the long-term average of the queue size for a node. In such an embodiment the queue law may be used to determine the shape of the control function as explained with respect to FIGS. 10 and 11 and the minimum buffer size as explained with respect to FIG. 12. The parameters of the control function are preferably set in the node congestion control module by a system administrator. For example, if the congestion control module is a RED implementation, the values of ($q_{min}$, $p_{min}$) ($q_{max}$, $p_{max}$) and $q_{clip}$ are input to define the control function. The control function may have any shape and is not limited to the shape as defined by the RED implementation.

The congestion control module receives data flows from a plurality of sources into an input. From the input, the data is placed into a buffer. As the buffer is filled with data, a queue is created. The position of the data within the buffer is tracked by a pointer that is controlled by a processor. The average queue size is calculated by a queue estimator and is then used to determine the drop percentage based upon the control function. The drop percentage is then used to drop packets within the queue, which slows down the sending rate evenly across all flows and as a result adjusts the average queue size.

The queue estimator is essentially a low-pass filter on the instantaneous queue size, which filters out brief queue changes and estimates the long-term queue average. In a preferred embodiment, an exponentially weighted moving average is used to calculate the average queue size. The average queue size is determined by first taking samples of the queue size every 6 seconds over a given time period, I, and exponentially weighting the averaging process by a weight factor, w. The average in the exponentially weighted moving average is calculated recursively based on previous average $q_k$ and a new sample $q_k$ so that $q_{k+1} = w q_k + (1-w) q_k$. To calculate the exponentially weighted moving average a value for the weight, w is necessary. The value for w is determined based upon the values of δ and I.

Figure 14:
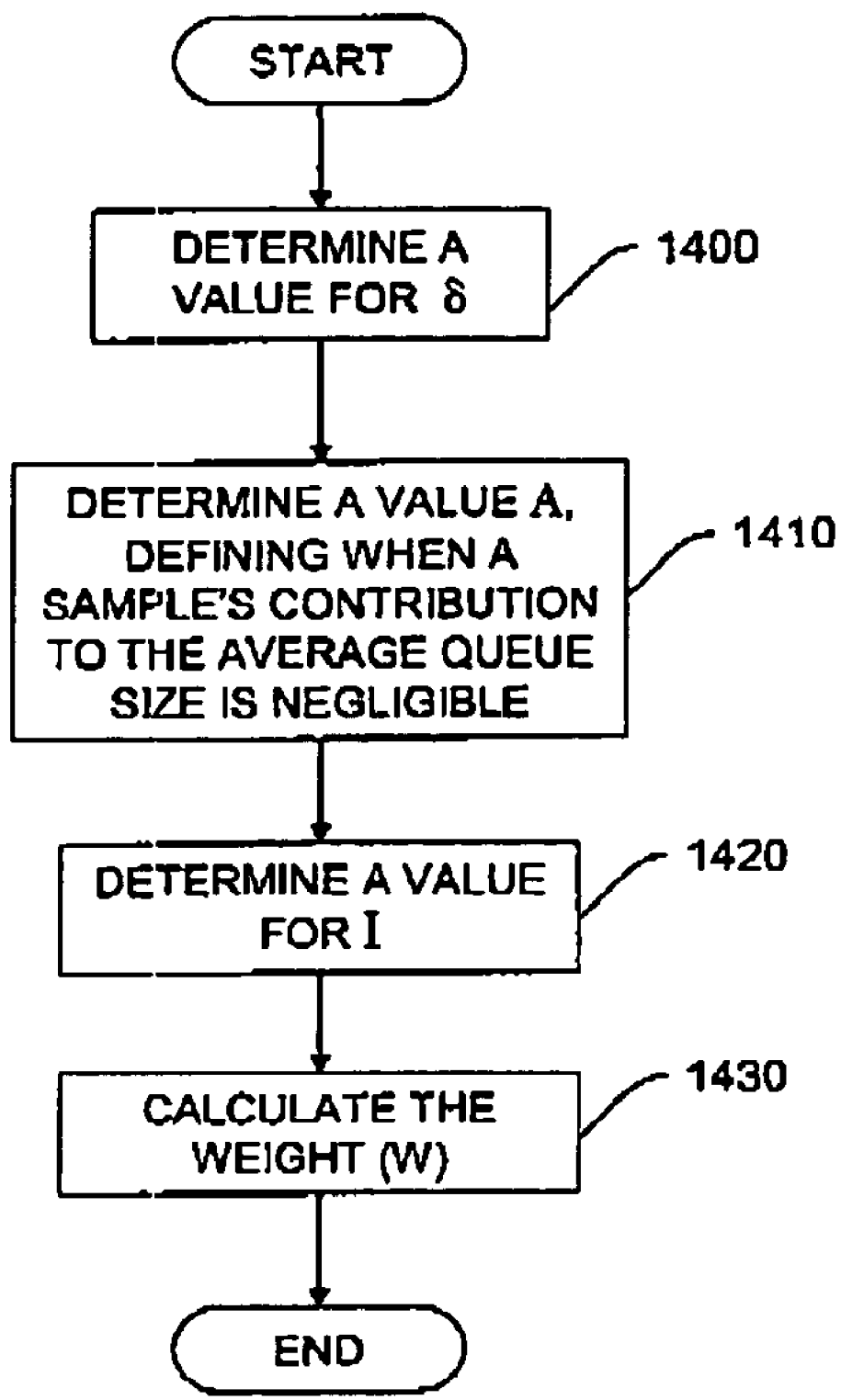
FIG. 14 is a flow chart of the method used in calculating the value of the weight, w. in a queue estimator

FIG. 14 shows a flow chart of the method used in calculating the value of the weight w. First, a value for δ is determined. It, δ, can be as small as possible, but is limited by implementation constraints. (Step 1400). The value of δ should be at most $R_{omin}$, which is the minimum round trip time for a packet, since the throughput of a TCP flow can only change rates based on a packet being sent and an acknowledgment either being received or not being received. As such, the queue size will not change with any significance in less than a round trip. A value defining when a sample's contribution is negligible is determined (Step 1410). In an exponentially weighted moving average, the contribution of each sample decreases exponentially with each passing time interval δ Therefore, the number of samples which contribute with any significance to the average may be calculated assuming a weight smaller than a value, a, which defines the point at which the sample's contribution is negligible. The value of a is between 0 and 1 and is typically assumed to be 0.1 or 1/e≅0.367. Knowing that, the number of samples, m, that contribute with any significance to the average may be calculated:

$$m = \frac{\ln(a)}{\ln(1-w)}$$

where the total time interval for all of the samples, I, may be substituted based on the fact that I=mδ, and therefore, $w=1-a^{\delta/I}$.

Figure 15:
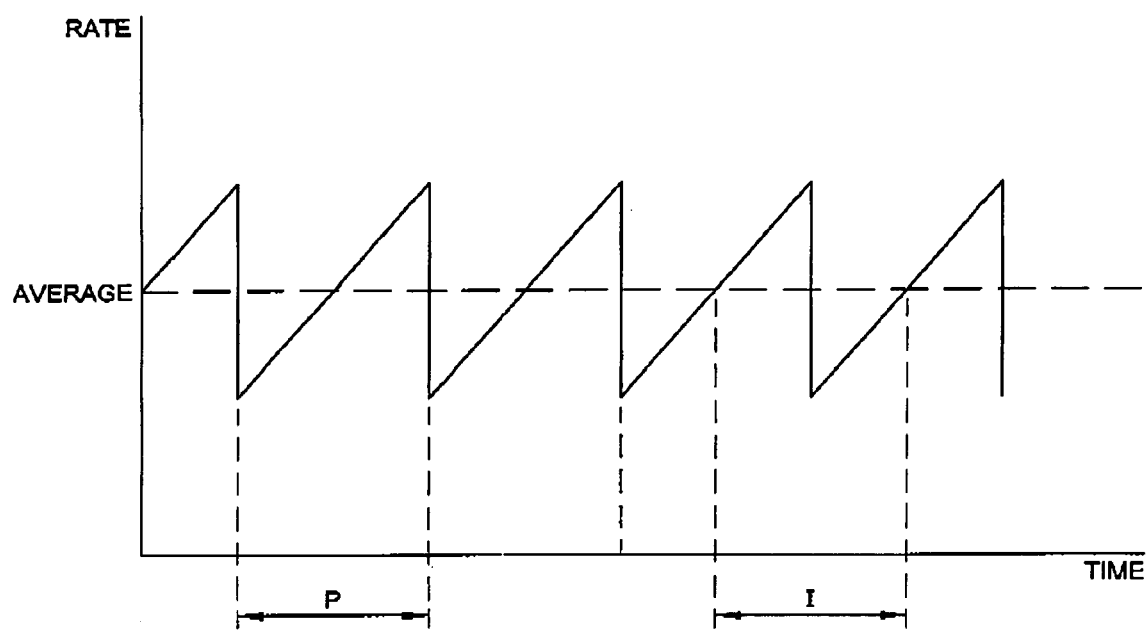
FIG. 15 is a graphical representation of the sending rate verses time for an exemplary communications network.

A value for 1 is then calculated (STEP 1420). The value of I is determined as the result of two opposing conditions for affecting the exponentially weighted moving average. The first condition is to provide an acceptable approximation of the long-term average of the system assuming a constant number of flows, wherein the approximation accurately accounts for small pertubations in the instantaneous average. The second opposing condition for the queue averaging algorithm is the ability of the approximation to account quickly for changes to the system such as a substantial increase in the number of flows using the following assumptions of the network, which provides a compromise between the two conditions is found. In a communications network that has n flows flowing into a node which have the same average round trip time, the throughput of each flow is τ=c/n and each flow has the same drop rate p. Additionally, it is assumed that the network implements a TCP congestion control algorithm in which the sending rate decreases when a packet is not acknowledged. In such a network, the sending rate over time is linearly increasing for a flow until a packet is dropped, when the rate is then decreased in half as shown in FIG. 15. The period of this function is denoted by P. The variation in sending rate is reflected in a similar variation in the queue size and thus the queue size has the same periodicity P. If the averaging interval of the moving average is equal to the period, then the average is equal to the long term average and the value does not change when the interval is translated in time. If the interval is smaller than the period I<P, then the average is no longer constant. For I>P, the moving average has a small variation, but converges rapidly to the long-term average.

P can then be determined as a function of average drop rate p and average round trip time R:

$$P = A(p, R) = \begin{cases} R\left(\frac{b}{2}W(p)+1\right) + \frac{Q(p, W(p))F(p)T_0}{1-p} & \text{if } W(p) < W_{\max} \\ R\left(\frac{b}{8}W_{\max} + \frac{1-p}{pW_{\max}} + 2\right) + \frac{Q(p, W_{\max})F(p)T_0}{1-p} & \text{otherwise} \end{cases}$$

Since P is a function of p and R, P can take multiple values depending on traffic conditions. For the purpose of ensuring the stability of the control system, I is taken to be the maximum value of P over all traffic conditions n, M, R, Wmax, within the predefined range $n_{min}, n_{max}, M_{min}, M_{max}, R_{min}, R_{max}, W_{maxmin}, W_{maxmax}$. I is chosen to be the maximum value of P so that the smaller intervals which produce averages with high variation can be accounted for. I is computed as follows:

$$I = \max(A(p_1, R_{0,max}+q_1/c), A(p_2, R_{0,max}+q_2/c))$$

where A is defined above and $(p_1, q_1)$ is the solution to $q_1 = G_{min}(p_1)$ $p_1 = H(q_1)$ and $(p_2, q_2)$ is the solution to $q_2 = G_{max}(p_2)$ $p_2 = H(q_2)$ The weight can then be calculated such that $w=1-a^{\delta/I}$ (Step 1430). From the value of the weight w, the long term average of the queue size can be calculated using the exponentially weighted moving average described above. The long term average queue size is then passed from the queue estimator to the processor, which uses the queue size to determine the drop probability for the node.

Figure 16:
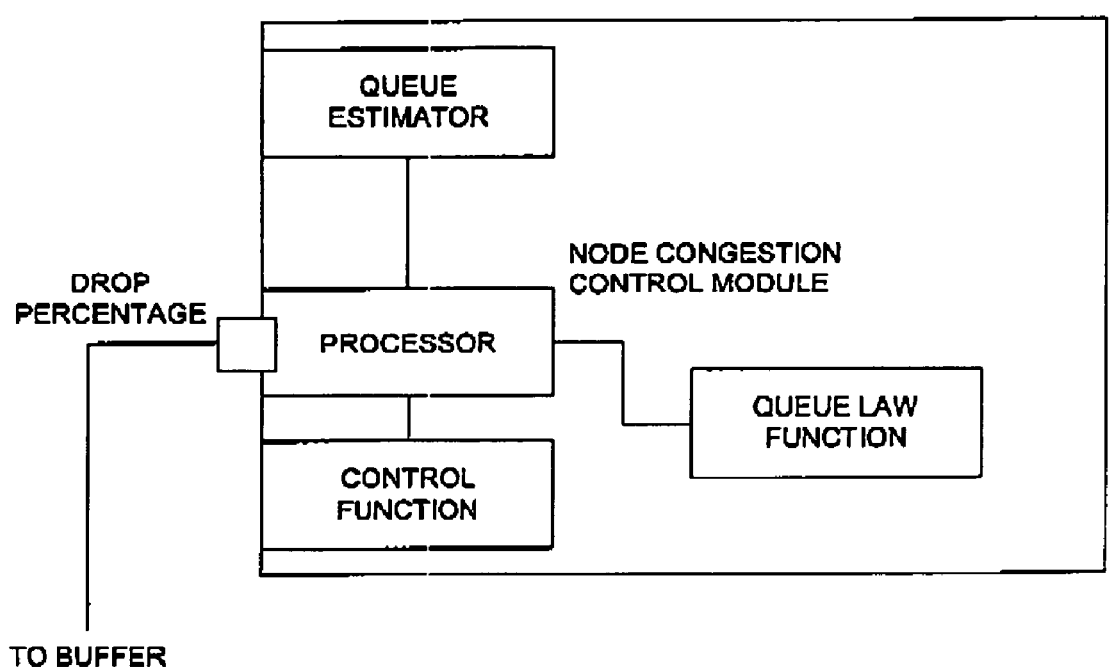
FIG. 16 is an alternative embodiment of a congestion control module in which the queue law is used for long term adjustment of the drop probability.

In yet another embodiment as shown in FIG. 16, in which a queue estimator and control function are used to provide congestion control in real-time for a node, the queue law may be used to periodically correct the location of the queue in the buffer. In such an embodiment, the queue law function is calculated on a periodic basis in a queue law module based upon input traffic conditions, which are sensed by sensors attached to the node housing the congestion control module. The queue law module may be part of a processor for calculating the control function or a separate processor. From the queue law function, the expected operation point may be calculated by finding the intersection of the queue law function with that of the control function of the congestion control module. The operation point, can then be compared to either the instantaneous queue size or an estimated moving average based upon instantaneous queue samples. If the instantaneous queue size or the estimated moving average is larger than the estimated queue size, the drop probability is increased to reduce the sending rate and if the queue size is smaller than the estimated queue size the drop probability is decreased so that the sending rate increases. In such an embodiment, the average queue size is adjusted to the estimated value the queue law function provides a means for compensating for drift in the queue, which may result from the queue estimator.

It should be understood by those of ordinary skill in the art that the method for defining the control function and thus $(p_{max}, q_{max})$, the method for defining the minimum buffer size and the method for determining the weight may be combined for determining RED parameters in a systematic manner. These RED parameters may then be entered by a system administrator for use in a RED congestion control module. Further, if the RED congestion control module requires a value for δ the method for calculating δ may also be part of the method for systematically determining the RED parameters.

Figure 17A:
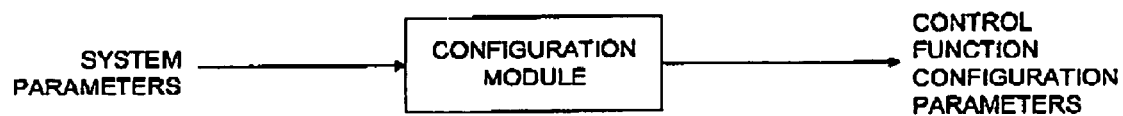
FIG. 17A shows an illustrative configuration module.
Figure 17B:
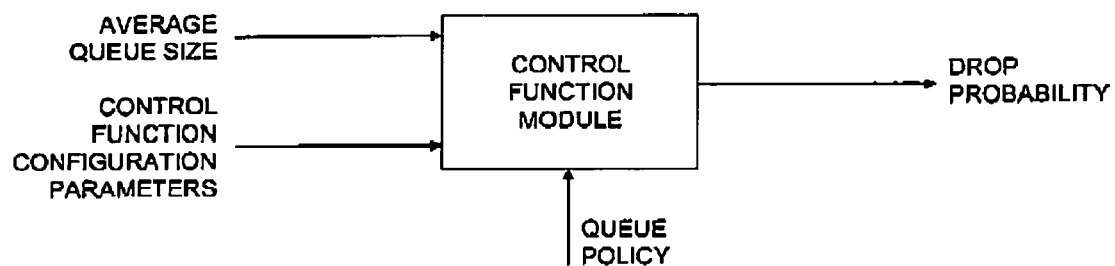
FIG. 17B shows a control function module that resides within a congestion control module.
Figure 18A:
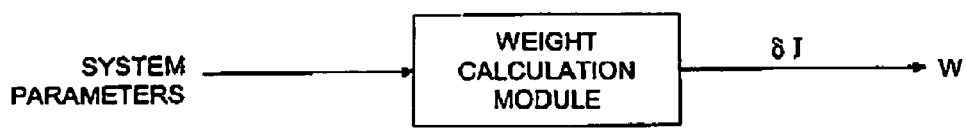
FIG. 18A shows a weight calculation module.
Figure 18B:
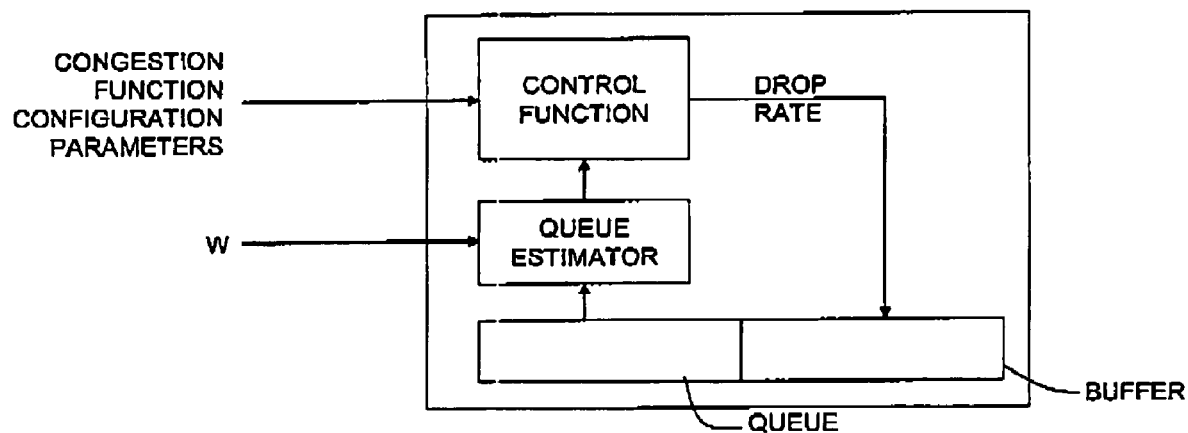
FIG. 18B shows a congestion control module which is similar to the congestion control module of FIG. 13, but FIG. 18B also shows the data which is necessary for configuring the congestion control module prior to operation.

FIG. 17A shows an illustrative configuration module in which system parameters as defined above are input into a configuration module and the disclosed methods for determining $(p_{max}, q_{max})$ and the buffer size are implemented. The output of the module which is control function configuration parameters may then be used by a system administrator to configure a control function module which resides within a congestion control module as shown in FIG. 17B. The control function configuration parameters of the buffer size and the maximum point of the control function $(p_{max}, q_{max})$ are used in combination with the desired queue policy to define the control function. Once the control function is defined the control function module can receive the average queue size as input and will then output the drop probability for the node containing the control module. FIG. 18A shows a weight calculation module that receives as input system parameters and at an intermediary stage determines the sampling period and the number of samples that significantly contribute to the average queue size. This weight calculation module may be part of the congestion control module or a completely independent module. The weight calculation module then uses the number of samples and the sampling period to determine a weighting value, which is then used for estimating the average queue size. FIG. 18B shows a congestion control module which is similar to the congestion control module of FIG. 13, but FIG. 18B also shows the data which is necessary for configuring the congestion control module prior to operation. As shown in FIG. 18B the weight for the queue estimator and the control function configuration parameters are necessary for the configuration of the control function which is part of the control function module.

In an alternative embodiment, the disclosed method and apparatus for queue management may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product). Although various exemplary embodiments of the invention have been disclosed, it should be apparent to those skilled in the art that various changes and modifications can be made which will achieve some of the advantages of the invention without departing from the true scope of the invention These and other obvious modifications are intended to be covered by the appended claims.

We claim:

1. A method for operating a second, sending network node relative to a first, receiving network node, the receiving node being operable to receive data packets sent by the sending node via a plurality of flows, the method comprising:

determining a queue law function of the first, receiving node based upon predetermined system traffic conditions, the queue law function being representative of average queue size of an exemplary queue of the receiving node based on traffic conditions and percentage of dropped packets; and determining a control function for the second, sending node based upon the queue law function, the control function defining a drop percentage when a buffer of the second node is filled above a predetermined threshold based upon an average queue size, wherein the control function prompts a gradual increase of drop probability of all data packets in flows bound for the receiving network node in an overload condition defined by intersection of the queue law function and the control function, whereby each flow between the sending node and receiving node is proportionally affected regardless of sending rate of particular flows.

2. A method according to claim 1, wherein the control function is a random early detection control function.

3. A method according to claim 1, wherein the control function does not have a non-bounded discontinuity.

4. A method according to claim 1, wherein the control function comprises two piecewise linear segments.

5. A method for modeling dynamics of a queue in a first, sending node having a buffer in order to determine a steady-state operating point of the first node relative to a second, receiving node, the receiving node being operable to receive data packets sent by the sending node via a plurality of flows, the method comprising:

calculating a queue law function dependent on traffic conditions at the second node, the queue law function being representative of average queue size of an exemplary queue of the receiving node based on traffic conditions and percentage of dropped packets; and determining a point of operation for the first node as the intersection of the queue law function and a predetermined control function for the first node, the control function defining a drop percentage when a buffer of the second node is filled above a predetermined threshold based upon an average queue size, wherein the control function increases drop probability of all data packets in flows bound for the receiving network node gradually in an overload condition, whereby each flow between the sending node and receiving node is proportionally affected regardless of sending rate of particular flows.

6. A method according to claim 5, wherein the point of operation defines a packet drop percentage for dropping a percentage of packets from the buffer.

7. A method for improving congestion control according to claim 5, wherein the node resides in a network.

8. A method for improving congestion control according to claim 7, wherein the network operates in a TCP environment.

9. A method for improving congestion control according to claim 5, wherein data received at a node is acknowledged.

10. A method according to claim 5, wherein the traffic conditions which determine the queue law function are the number of flows into the node, an average packet size and an average round trip transmission time.

11. A method according to claim 5, wherein the function is determined by assuming that the node does not experience feedback.

12. A method according to claim 5, wherein the point of operation determines a drop rate.

13. A method according to claim 5, further comprising: dropping packets from the buffer at the determined drop rate.

* * * * *